3,395,961
LIGHT DEFLECTOR
John F. Ready, Minneapolis, Minn., assignor to
Honeywell Inc., a corporation of Delaware
Filed Oct. 28, 1964, Ser. No. 407,098
12 Claims. (Cl. 350—160)

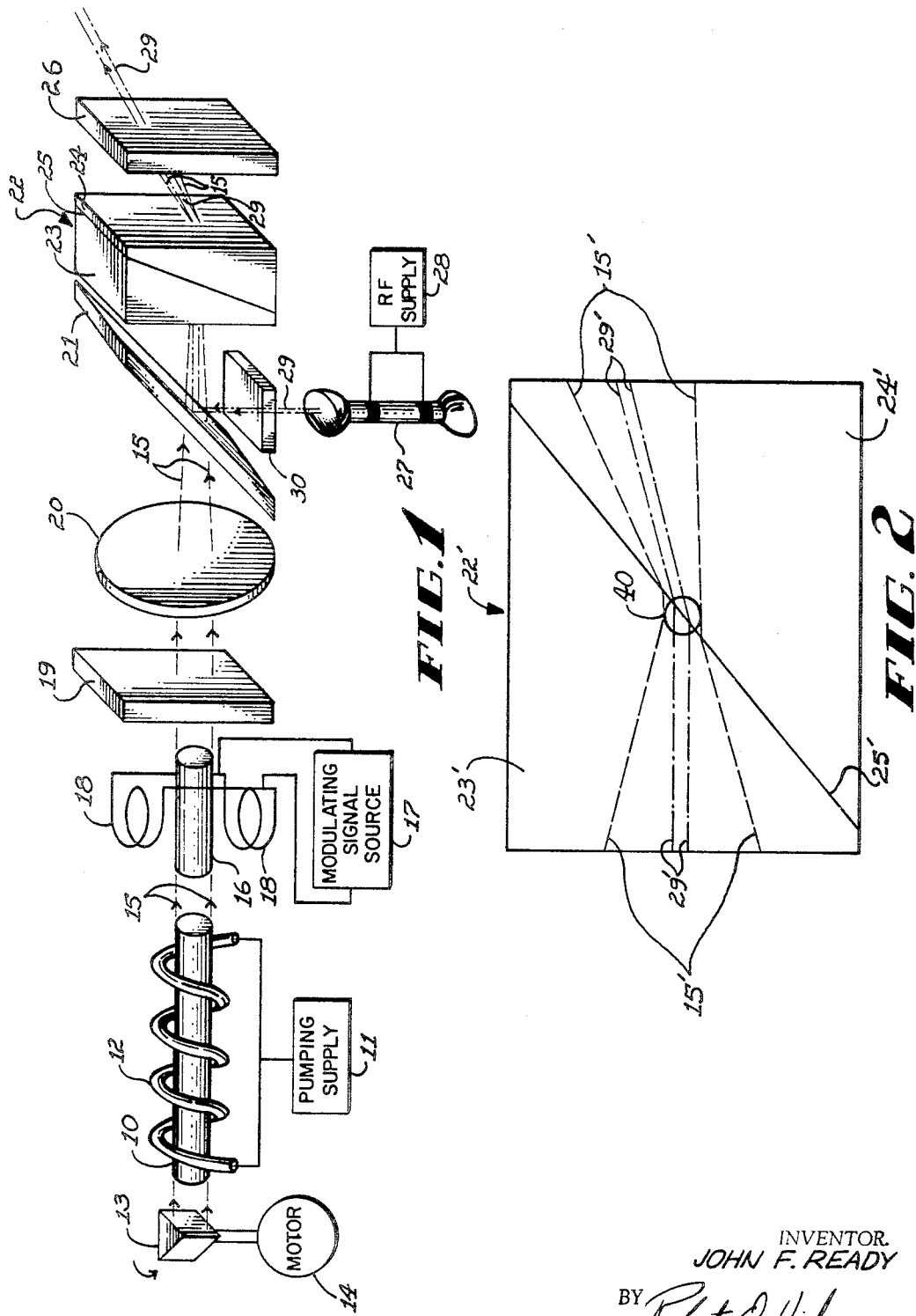

ABSTRACT OF THE DISCLOSURE

Deflection of a low intensity light beam on passage through a dielectric material having an index of refraction that varies with the strength of an applied electric field. The electric field is provided by a high intensity laser beam that is modulated to vary the electric field intensity and correspondingly the index of refraction of the dielectric material.

The present invention is related to a laser apparatus method and more particularly to an apparatus and method for inertialess bending of light beams using a laser output.

It is known that very high electric fields are capable of producing nonlinear effects in the optical properties of certain dielectric media. When an electric field is applied, dielectric media become polarized according to the equation:

$$P_i = x_{ij}E_j + x'_{i\,jk}E_jE_k + x''_{i\,jkl}E_jE_kE_l + \ldots$$
$$P_j = x_{jj}E_j + x'_{j\,jk}E_jE_k + x''_{j\,jkl}E_jE_kE_l + \ldots$$

and $$P_k = x_{kj}E_j + x'_{k\,jk}E_jE_k + x''_{k\,jkl}E_jE_kE_l + \ldots$$

where:

$P_i$, $P_j$, $P_k$ are the $i$, $j$, and $k$ components of the polarization vector, $x_{ij}$, $x_{jj}$, $x_{kj}$ are second rank tensors representing the $i$, $j$, and $k$ components of the first order susceptibility of the material, $x'_{i\,jk}$, $x'_{j\,jk}$, $x'_{k\,jk}$ are third rank tensors representing the components of the second order, nonlinear susceptibility of the material, $x''_{i\,jkl}$, $x''_{j\,jkl}$, $x''_{k\,jkl}$ are fourth rank tensors representing the components of the third order, nonlinear susceptibility of the material, and $E_j$, $E_k$, $E_l$ are components of the electric field vector, and the notation denotes summation over any indices which appear twice in the same term.

The coefficients in the nonlinear susceptibilities ($x'$ and $x''$) are small enough that the terms containing them are negligible except in the case of very high electric fields in certain media. In such high fields, the second or third order terms in the above power series equations for the polarization can produce an observable effect in bending of light beams if one or more of them has a magnitude about 0.01% as large as the first order term. Of course, the larger the relative magnitude of the higher order terms, the larger the nonlinear effect. A material having a nonlinear susceptibility capable of yielding a nonlinear term in the polarization equations with a magnitude about 0.01% or greater of that of the first order term will be denominated "a relatively large nonlinear susceptibility." It is the relatively large nonlinear terms which cause changes in the refractive index of these media responsive to changing strong electric fields. The present invention, then, utilizes dielectric materials having a relatively large nonlinear susceptibility. Stated differently, the invention utilizes dielectric media whose refractive index is variable with a varying high intensity applied electric field.

Inertialess bending of light is important because the light beam can be variably deflected at higher frequencies than with any scheme using mechanical motion and inertia. The present invention utilizes a probe beam of light shined through a dielectric material whose refractive index varies with variations in a strong applied electric field. A laser beam is focused on a spot coinciding with the light path through the dielectric material to create a high intensity electric field at that spot. Modulation of the laser output causes the field intensity at the focal spot to vary. This intensity variation causes a variation in the refractive index at the focal spot. Thus, the probe beam is bent a varying amount in response to the varying refractive index as it passes through the spot. The method and apparatus of the invention avoid several difficulties of the prior art. Due to the coherence properties of the laser beam, a high intensity electric field can be focused on a relatively small area in the dielectric material. Thus, the total energy in the field is less than that required to accomplish a similar bending without accompanying focusing. Also, the ability to focus a laser beam on a small spot provides a relatively simple means for achieving a nonlinear electric field in the dielectric medium. Since laser beams may be modulated at microwave frequencies, the electric field is also modulated at the same rate. This causes the probe beam to be variably deflected at microwave frequencies. Such deflected beams are useful, for example, in optical recorders.

The invention may be more fully understood when taken in conjunction with the detailed description and drawings wherein:

FIGURE 1 is a diagrammatic representation of a system utilizing the invention; and FIGURE 2 is a diagrammatic cross-section of a light deflector utilizing the invention.

Referring now to FIGURE 1, a high intensity electric field producing means is shown as a high power laser 10. A pumping supply 11 provides energy to a helical flash lamp 12 for optically pumping laser 10. High power output is obtained by Q-switching laser 10. A prism 13 spun by a motor 14 provides the Q-switch. Laser 10 emits a laser beam 15. Emiter bear 15 is intensity modulated by an absorption modulator 16. Signals from a modulating signal source 17 are carried through field coils 18 to create a varying magnetic field about modulator 16. The varying magnetic field alters the absorption characteristics of modulator 16 to cause modulation of beam 15. Modulated beam 15 passes through a polarizer 19, a focusing means, here shown as a lens 20, a dielectric coated dichroic beam splitter 21, and a deflector 22. Deflector 22 is here shown as a quartz portion 23 contacting a plain glass portion 24 along an interface 25. Upon emerging from deflector 22, laser beam 15 is blocked by an analyzer 26. A second light source, here shown as a He-Ne gas laser 27, is pumped by a radio frequency (RF) supply 28, and emits a probe beam 29, which is the beam to be deflected. Probe beam 29 passes through polarizer 30, is reflected from beam splitter 21, and passes through deflector 22 and analyzer 26.

Presently available Q-switched ruby lasers providing peak powers of about 2 megawatts are operable to cause observable deflection of probe beam 29. However, higher power outputs and lasers capable of continuous high power outputs will substantially increase the obtainable deflection. The laser pumping lamp and Q-switch may be any one of a number of types known in the art. Modulator 16 may be replaced by any means for intensity modulating laser beam 15. Preferably, the modulator should be operable at microwave frequencies. The polarizers and analyzer utilized in the system may be any of a number well known in the art. The focusing means may, for example, be a simple or complex lens. A spherically corrected lens will decrease the spot size thereby increasing the electric field density. Such lenses are well known. Beam splitter 21 may be replaced by any means for superimposing laser beam 15 on probe beam 29. Deflector 22 need not define an internal interface with another material. It may, instead, be constructed wholly of any dielectric material which, like portion 23, exhibits a change in its refractive index with a high intensity electric field and which is transparent to the probe beam. Laser beam 15 may be focused either in an interior region or on the surface of portion 23. One surface of portion 23 may define an interface with either another shaped material like portion 24 or with a surrounding medium such as air. Other examples of media whose refractive indices may be affected by high electric fields are carbon disulfide and nitrobenzene. If bending at an interface is desired, the carbon disulfide may be utilized in contact with air to define a carbon disulfide-air interface. Finally, the second light source may be any light source providing a collimated beam. Preferably, the source provides monochromatic light to reduce dispersion effects. It may be either a coherent or non-coherent source and should provide a beam having a relatively small electric field compared to that created by focused laser beam 15 to avoid uncontrolled changes in refractive index at the focal spot.

In operation, laser beam 15 is intensity modulated by a signal from signal source 17 upon passing through modulator 16. Beam 15 is then linearly polarized upon passing through polarizer 19. Polarized beam 15 passes through lens 20, beam splitter 21, and deflector 22. Lens 20 focuses polarized beam 15 at a spot contacting portion 23. Laser 27 emits probe beam 29. Probe beam 29 is linearly polarized by polarizer 30. Polarizer 30 is positioned to polarize probe beam 29 in a plane rotated 90° from that of laser beam 15. Polarized probe beam 29 is reflected from the surface of beam splitter 21. Laser 27 and beam splitter 21 are positioned so that reflected probe beam 29 is directed at the focal spot for laser beam 15. Both probe beam 29 and laser beam 15 are bent at the focal spot. The amount of bending varies with the intensity of laser beam 15. Thus, probe beam 29 is variably deflected at a frequency corresponding to the laser modulation frequency. Operable frequencies extend well into the microwave range. Superimposed deflected beams 15 and 29 emerge from deflector 22 and impinge upon analyzer 26. Analyzer 26 is oriented to pass probe beam 29 and block diverging laser beam 15. Such an orientation is achieved by crossing analyzer 26 and polarizer 19. Emerging, deflected, collimated, probe beam 29 may be utilized for recording on a light sensitive medium or in any other manner desired.

Operation of the deflection mechanism will be described with reference to FIGURE 2. FIGURE 2 is a diagrammatic cross-sectional view of a deflector similar to that in FIGURE 1. Primed numbers are used to indicate corresponding parts. Deflector 22' includes a first transparent dielectric medium 23' whose refractive index varies with application of a varying high intensity electric field. A different medium 24' whose index of refraction is preferably not affected by the field is adjacent medium 23'. Media 23' and 24' define an interface 25'. Laser beam 15' is preferably focused at a spot 40 whose center lies on interface 25'. A collimated probe beam 29' is directed at interface 25' so that its center coincides with the center of spot 40. Probe beam 29' is preferably directed at interface 25' at an angle very close to the critical angle for total reflection in medium 23'. The position of focal spot 40 and the angle of incidence of probe beam 29' are chosen to provide a maximum deflection for a given change in the refractive index of medium 23'. The scheme is also operable if spot 40 lies in the interior of medium 23' and probe beam 29' passes through it. When probe beam 29' is directed at interface 25' to pass through spot 40 at an angle other than one close to the critical angle, deflection of probe beam 29' decreases slightly. Intensity modulation of laser beam 15' by the superposition of a modulating signal varies the electric field intensity at spot 40 with the beam intensity. Medium 23' is chosen so that the high intensity electric field varies its refractive index. These variations are a manifestation of the nonlinear susceptibility of the dielectric. That is, the polarization of the medium is represented by power series equations in which a high intensity field makes the squared, cubed, or higher order terms large enough to significantly affect the magnitude and/or direction of the polarization vector. After bending at interface 25', diverging laser beam 15', superimposed upon deflected, collimated, probe beam 29', traverses medium 24'.

As examples of deflections which are attainable utilizing specific embodiments, first, a probe beam directed toward a quartz-glass interface at the zero field critical angle is deflected about $2 \times 10^{-2}$ radians by a Q-switched laser, which emits one joule in $10^{-8}$ seconds and is focused on an area of $10^{-5}$ cm.$^2$. For a probe beam emerging into air from carbon disulfide at an angle near the critical angle, a deflection of about four times the beamwidth of the probe beam, whose spreading angle is determined by diffraction through the focal spot, can be obtained by superimposing a two megawatt peak power spinning prism laser beam which is focused to a spot of the order of 300 microns in diameter. Utilizing a probe beam similarly directed at carbon disulfide and superimposing a 100 megawatt peak power Q-switched laser beam focused with a spherically corrected lens, a focal spot 100 microns in diameter may be obtained, and the beam may be deflected 15 times the beamwidth.

It is readily apparent to those skilled in the art that many modifications of the proposed system may be made without departing from the principles of the invention. It should be understood that the invention is not limited by the particular embodiments described, but only by the scope of the appended claims.

I claim:
1. An apparatus for variably bending light comprising:
    a high power laser;
    means for varying the laser light intensity in response to a modulating signal;
    means for polarizing the laser light in a first direction;
    a second light source;
    means for polarizing light from the second source in a second direction;
    a transparent dielectric material having a variable refractive index responsive to variations in applied laser light intensity and positioned in the light path from the second source;
    means for superimposing the laser beam on the beam from the second source;
    means for focusing the laser beam at a spot coincident with the second source light path through the material to bend the second source light at the spot; and
    means for analyzing the bent light to separate the second source light from the laser beam.
2. An apparatus for bending light comprising:
    a high power laser;
    a second light source;
    a transparent dielectric material having a variable refractive index responsive to variations in applied laser light intensity and positioned in the second source light path;
    means for superimposing the laser light path on the second source light path;
    means for focusing the laser light at a spot coincident with the second source light path through the material to bend the second source light path at the spot; and
    means for separating the bent second source light from the laser light.

3. An apparatus for bending light comprising:
a carbon disulfide deflector defining an interface with a surrounding medium;
a high power laser;
a second light source positioned to direct a beam of light at the carbon disulfide side of the interface at an angle near the critical angle for total reflection; and
means for focusing the laser light at a spot on the interface coincident with the second source light path to vary the refractive index of the carbon disulfide at the spot.

4. An apparatus for bending light comprising:
a body defining a quartz-glass interface;
a high power laser;
a second light source positioned to direct a beam of light at the quartz side of the interface at an angle near the critical angle for total reflection;
means for superimposing the laser beam on the second light beam;
means for focusing the laser beam at a spot on the interface to vary the refractive index of the quartz at the spot; and
means for separating the second light beam emerging from the interface from the laser beam.

5. An apparatus for variably bending light comprising:
a high power laser;
means for varying the intensity of the laser light in response to a modulating signal;
a second light source;
a transparent dielectric material having a relatively large nonlinear susceptibility and positioned in the light path from the second source; and
means for focusing the varying laser light at a spot in the medium coincident with the path of light from the second source to cause variable bending of the second source light beam at the spot.

6. An apparatus for inertialess bending of light comprising:
high intensity electric field producing means;
light source means;
a dielectric material transparent to light from the source positioned in the light path from the source the material having an electric field dependent index of refraction; and
means for focusing the electric field at a spot in the medium coincident with the light path from the source to vary the index of refraction at the spot.

7. Apparatus according to claim 6 wherein the dielectric material is quartz.

8. Apparatus according to claim 6 wherein the dielectric material is carbon disulfide.

9. Apparatus according to claim 6 wherein the dielectric material is nitrobenzene.

10. An apparatus for bending light comprising:
essentially coherent high power light source means;
further light source means;
a transparent dielectric material having a relatively large nonlinear susceptibility, the material positioned in the light path from the further source means; and
means for focusing the coherent light at a spot in the material coincident with the light path from the further source means to bend light from the further source means at the spot.

11. A method of bending light comprising:
shining light through a dielectric medium having an electric field dependent index of refraction; and
forming an intense electric field within a region at least partially coincident with the light path through the medium to vary the index of refraction of the medium in only this region.

12. An apparatus for bending light comprising:
a transparent dielectric material having a relatively large nonlinear susceptibility;
essentially coherent high power light source means, the light path from the high power light source traversing the dielectric material; and
further light source means, the light path from the further light source traversing the dielectric material and at least partially coincident the light path from the high power light source means within the dielectric material to cause bending of the light beam from the further light source.

References Cited

UNITED STATES PATENTS 2,836,652    5/1958    Sprague    350—160
2,915,943    12/1959    Brown et al.    350—160

JEWELL H. PEDERSEN, *Primary Examiner.*

W. L. SIKES, *Assistant Examiner.*